Feb. 27, 1923.

G. N. BRUNKER 1,447,120

MOVABLE HEADLIGHT

Filed May 31, 1921

G. N. Brunker
INVENTOR

BY Victor J. Evans
ATTORNEY

WITNESS:

Feb. 27, 1923.
G. N. BRUNKER
1,447,120
MOVABLE HEADLIGHT
Filed May 31, 1921
3 sheets-sheet 2
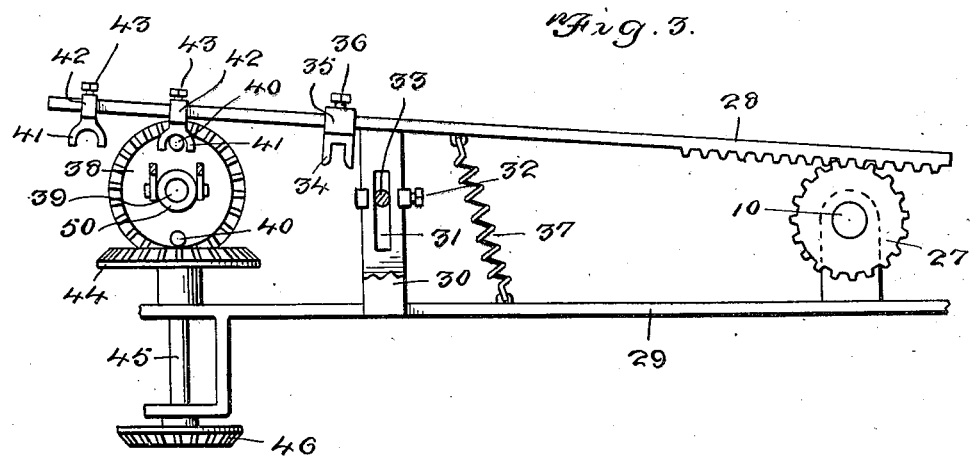
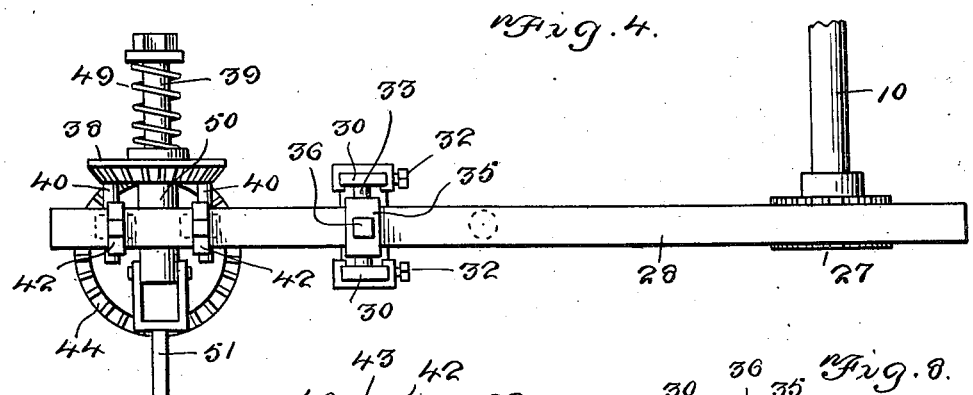
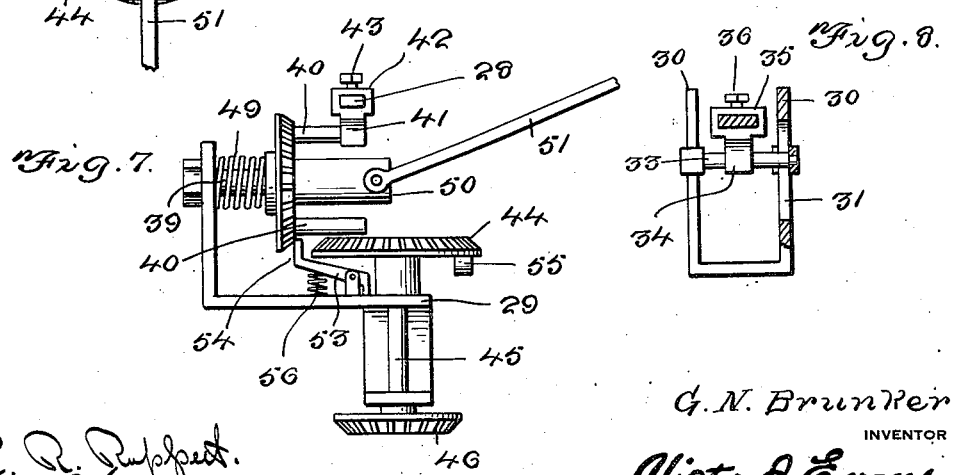
G. N. Brunker
INVENTOR
BY Victor J. Evans
ATTORNEY

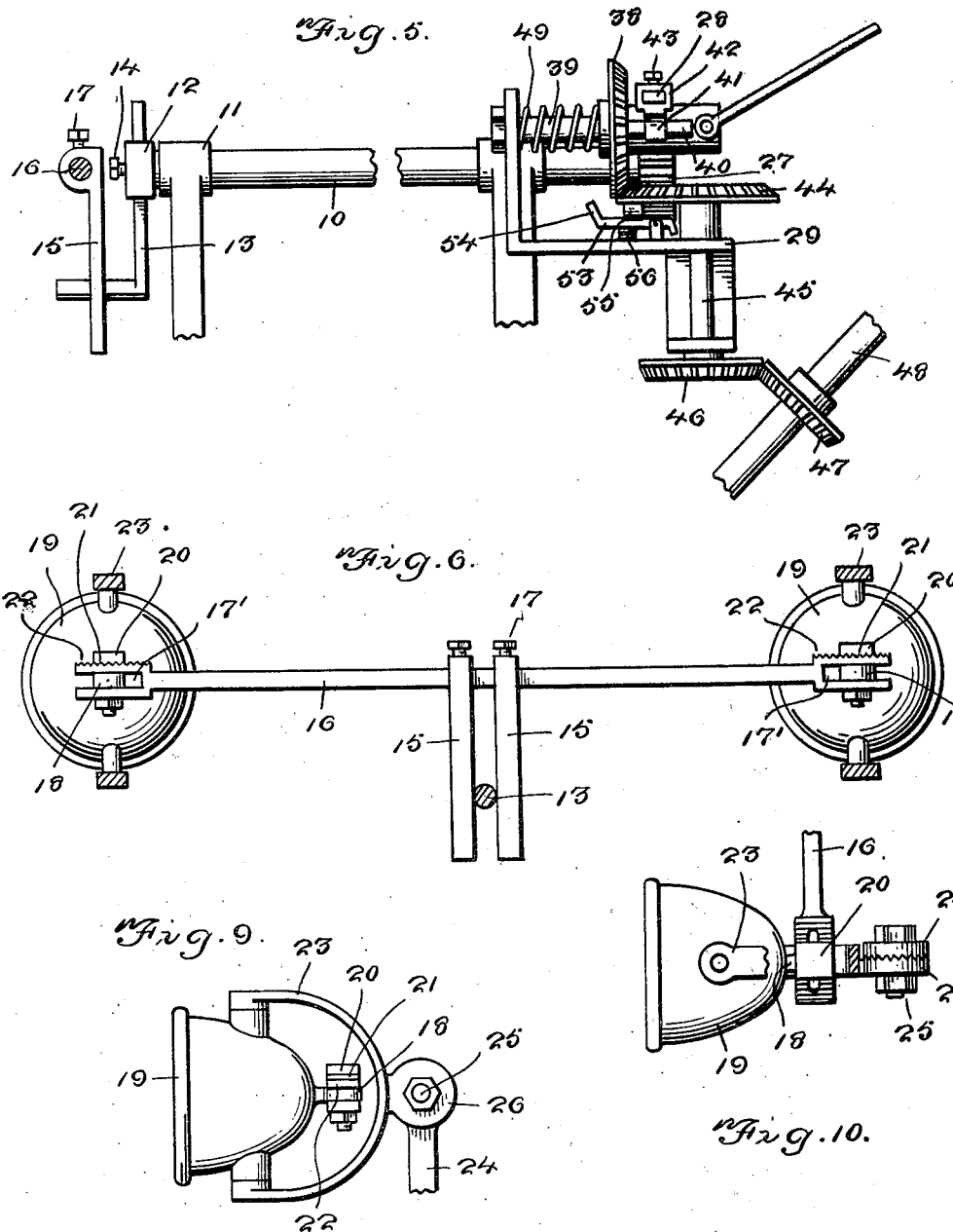

Patented Feb. 27, 1923.

1,447,120

UNITED STATES PATENT OFFICE.

GEORGE N. BRUNKER, OF POCATELLO, IDAHO.

MOVABLE HEADLIGHT.

Application filed May 31, 1921. Serial No. 473,646.

*To all whom it may concern:*

Be it known that I, GEORGE N. BRUNKER, a citizen of the United States, residing at Pocatello, in the county of Bannock and State of Idaho, have invented new and useful Improvements in Movable Headlights, of which the following is a specification.

This invention relates to dirigible head lights for automobiles and has for an object the provision of means connecting the head lights and the steering post of an automobile for automatically directing the lights rays in the direction of travel of the front wheels, so as to properly light the roadway in the proposed direction of travel of the vehicle.

Another object is the provision of means whereby the head light operating mechanism may be disconnected, so as not to be affected by the operation of the steering wheels, means being provided for holding the lamps rigid when thus disconnected.

Another object is the provision of means for preventing movement of the head lights, due to the lost motion usually found in automobile steering apparatus, the lamps being held against movement until the steering post is operated to change the direction of travel of the vehicle.

Another object is the provision of means whereby the lamps may be manually adjustable both laterally and vertically, so as to regulate the manner in which the rays are directed upon the roadway.

With the above and other objects in view, the invention further includes the following novel features and details of construction, to be hereinafter more fully described, illustrated in the accompanying drawings and pointed out in the appended claims.

In the drawings:—

Figure 3 is a view similar to Figure 2 with the parts in a different position.

Figure 4 is a plan view of the parts shown in Figures 2 and 3.

Figure 5 is an enlarged section on the line 5—5 of Figure 1.

Figure 6 is a sectional view on the line 6—6 of Figure 1.

Figure 7 is a detail view showing the position of the parts when the lamp mechanism is disengaged from the steering mechanism.

Figure 8 is a section on the line 8—8 of Figure 2.

Figure 9 is an enlarged fragmentary view of one of the head lamps and its connections.

Figure 10 is a plan view of the same with parts broken away.

Figure 1:
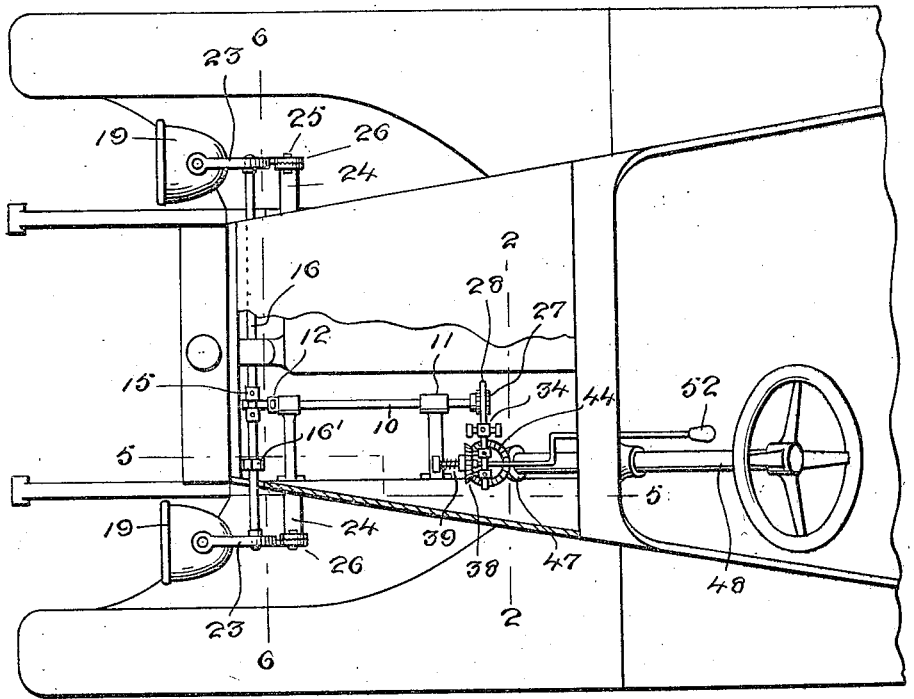
Figure 1 is a top plan view of the front portion of an automobile with parts broken away and showing the invention applied.
Figure 2:
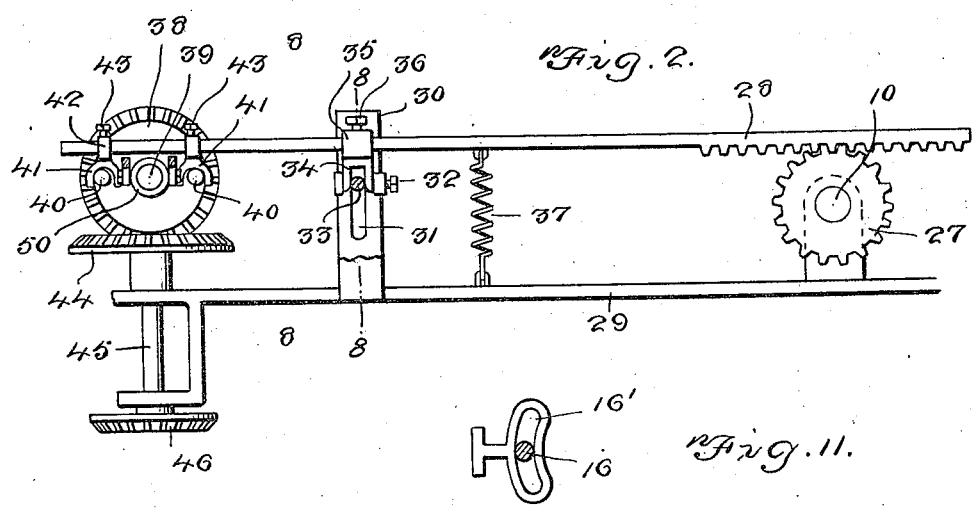
Figure 2 is a section on the line 2—2 of Figure 1.
Figure 11:
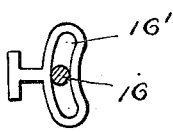
Figure 11 is a detail view showing the guide for the connecting rod.

Referring in detail to the drawings, wherein like characters of reference denote corresponding parts, the reference character 10 indicates a rock shaft which is disposed longitudinally of an automobile and is mounted in bearings 11, the latter being secured to any suitable stationary part of the vehicle. The outer end of the rock shaft carries a sleeve 12 and located within this sleeve is a substantially L-shaped arm 13 which is capable of vertical adjustment and which is held in its adjusted position by means of a set screw 14.

The arm 13 extends forwardly and is disposed between a pair of vertically arranged guide bars 15, which are properly spaced to receive the arm 13. The guide bars 15 are adjustably mounted upon a connecting rod 16, as shown at 17, so that they may be properly positioned upon the connecting rod and properly spaced to receive the arm 13.

Each end of the connecting rod 16 is bifurcated as shown at 17 so as to provide spaced ears for the reception of an ear or lug 18 which extends from the rear of each of the head lamps 19 of the automobile. The ears are all perforated to receive a pin 20 and the under face of the head of this pin is toothed or serrated as shown at 21. These teeth or serrations 21 are adapted to engage similar teeth or serrations 22 provided upon the upper face at each end of the connecting rod 16. The perforations in the rod 16 through which the pins 20 pass are elongated so as to form slots and the pins 20 may thus be positioned at any point within these slots and held in this position through the engagement of the teeth or serrations 21 and 22. This provides for lateral adjustment of the lamps 19 and permits the rays of light to cover a greater or less area as desired.

The lamps are mounted for pivotal movement in brackets 23, the ears or lugs 18 extending through these brackets. The members 23 are supported upon standards 24, to which they are pivotally connected by means of a pin 25, the latter passing through apertured ears 26 whose opposed faces are toothed or serrated to prevent relative accidental movement. The standards 24 are supported upon any suitable part of the vehicle.

For the purpose of imparting movement to the rock shaft 10, the latter is provided near its rear end with a pinion 27. This pinion is engaged and operated by a rack bar 28 which is movable transversely of the automobile and is operated by the movement of the automobile steering post, as will be hereinafter explained. Secured to a suitable part of the vehicle frame is a bracket 29 and extending from this bracket are spaced standards 30 which are longitudinally slotted as shown at 31. Extending through and secured within the slots 31 by means of suitable fastening devices 32, is a bar 33. This bar is normally engaged by a locking fork 34, by which it is embraced, the said fork being carried by a sleeve 35 which is slidably and adjustably mounted upon the rack bar 28 and which is held in adjusted position by means of a set screw 36. A spring 37 connecting the rack bar 28 with the bracket 29 serves to normally hold the fork 34 engaged over the rod 33. This acts to lock the head lamps 19 against lateral and pivotal movement by preventing rotation of the pinion 27 and consequently preventing any action of the rack bar 10.

In order to release the rack bar 28 and to operate the same so as to rotate the pinion 27, there is provided a beveled pinion 38, which is mounted upon a shaft 39 secured in suitable bearings. The beveled pinion 38 has extending axially therefrom spaced pins 40 and engageable over these pins are forks 41, which are similar to the fork 34 previously mentioned and like this previously mentioned fork are carried by sleeves 42 which are adjustably mounted upon the rack bar 28 and held against accidental movement by set screws 43. The rotation of the beveled pinion 38 in either direction will, through the engagement of either of the pins 40 with the forks 41, lift this end of the rack bar 28, the parts being so proportioned and adjusted that this lifting movement will disengage the fork 34 from the rod 33 and also impart longitudinal movement to the rack bar for the operation of the pinion 27. The direction of movement is of course governed by the direction of rotation of the beveled pinion 38. Motion is imparted to the pinion 38 by means of a pinion 44 which is mounted upon a shaft 45, rotatable in suitable bearings provided in the bracket 29. The opposite end of the shaft 45 has secured thereon a pinion 46 which engages a pinion 47 secured upon the steering post 48 of the automobile. By this means the act of steering the vehicle will, through the rotation of the steering wheel post impart movement to the rock shaft 10 in the manner previously explained, so that said rock shaft will move the connecting rod 16 transversely of the vehicle and move the lamps 19 upon their pivotal mounting. By providing the connections shown and described between the rack bar 28 and the steering post 48, lost motion which is usually found in automobile steering posts will not impart any movement to the lamps 19, the position of the rod 33 being regulated in accordance with the amount of lost motion in the steering mechanism. Thus, by adjusting the rod 33 to a greater height, the rack bar 28 will be elevated and the steering post must rotate a greater distance before either of the pins 40 engage their respective forks 41, the normal position of the said pins 40 being out of engagement with the said forks 41.

The invention further provides means for disengaging the lights from the steering mechanism and for this purpose, the pinion 38 is slidably mounted upon its shaft 39 and is normally held engaged with the pinion 44 by means of a coiled spring 49 which surrounds said shaft. Slidably mounted upon the shaft 39 is a sleeve 50 to which is connected one end of a rod 51, the opposite end of this rod extending through the dash or instrument board of the vehicle and being provided with an operating handle 52. By this means the sleeve may be pushed inwardly along the shaft 39 for contact with the pinion 28 to disengage the latter from the pinion 44. Pivotally secured to the bracket 29 is one end of a locking dog 53, the opposite end of this dog being disposed at an angle and extending toward the shaft 39 at the rear of the pinion 30 to provide a stop 54. Normally this stop is disposed adjacent the rear face of the pinion 30, whereupon the said pinion and the pinion 44 will be held against accidental disengagement. As it is desired to unlock or disengage the pinions 28 and 44 only when the vehicle is traveling straight ahead, the parts are so arranged that the stop may only be moved out of the path of the pinion when the lamps are in this position. For this purpose the pinion 44 carries upon its under face a cam 55 which normally occupies a position above the pivoted member 53 and acts to depress the latter against the action of the spring 56. When steering the vehicle the cam 55 will move out of engagement with the pivoted member 53 so as to permit the stop to move upward behind the pinion 30 where it will remain until the wheels of the vehicle are again straightened out. It is therefore necessary to disengage the pinion 28 from the gear 44 when the wheels of the vehicle are straight ahead, should it be desired to disengage the operating mechanism for the lamps. By moving the pinion 30 inward against the action of the spring 49 and then permitting the stop 54 to engage the opposite face of the pinion 30, the latter will be held disengaged from the pinion 44.

If desired a suitable brace or guide 16' may be mounted upon a stationary part of the automobile and connected to the rod 16 to prevent vibration.

The invention is susceptible of various changes in its form, proportions and minor details of construction and the right is herein reserved to make such changes as properly fall within the scope of the appended claims.

Having described the invention what is claimed is:—

1. The combination with pivotally mounted headlights and the steering post of an automobile, of a rock shaft, means connecting the rock shaft to the headlights whereby operation of the former will impart pivotal movement to the latter, gearing connected to and operated by the steering post, a gear mounted upon the rock shaft, a rack bar engaging said gear and means including pin and fork connections between the rack bar and steering post operated gearing, whereby operation of the latter in either direction will impart longitudinal movement to the rack bar to pivotally move the headlights.

2. The combination with pivotally mounted headlights and the steering post of an automobile, of a rock shaft, means connecting the rock shaft to the headlights, whereby operation of the former will impart pivotal movement to the latter, gearing connected to and operated by the steering post, a gear mounted upon the rock shaft, a rack bar engaging said gear, means for locking the rack bar against longitudinal movement and means connecting the rack bar and steering post operated gearing, whereby operation of the latter will release the rack bar and move the same longitudinally to impart pivotal movement to the headlights.

3. The combination with pivotally mounted headlights and the steering post of an automobile, of a rock shaft, means connecting the rock shaft to the headlights, whereby operation of the former will impart pivotal movement to the latter gearing connected to and operated by the steering post, a gear mounted upon the rock shaft, a rack bar engaging said gear, a rod disposed transversely beneath the rack bar, means carried by the rack bar and normally engaging the rod to hold the rack bar against longitudinal movement and means connecting the rack bar and steering post operated gearing, whereby operation of the latter will release the rack bar and move the same longitudinally to impart pivotal movement to the headlights.

4. The combination with pivotally mounted headlights and the steering post of an automobile, of a rock shaft means connecting the rock shaft to the headlights, whereby operation of the former will impart pivotal movement to the latter, gearing connected to and operated by the steering post, a gear mounted upon the rock shaft, a rack bar engaging said gear, a rod disposed transversely beneath the rack bar, a fork carried by the rack bar and normally engaging the rod to hold the rack bar against longitudinal movement and means connecting the rack bar and steering post operated gearing, whereby operation of the latter will release the rack bar and move the same longitudinally to impart pivotal movement to the headlights.

In testimony whereof I affix my signature.

GEORGE N. BRUNKER.